United States Patent [19]

Tanabe et al.

[11] Patent Number: 5,306,806
[45] Date of Patent: Apr. 26, 1994

[54] THERMOSETTING POLYESTER RESIN AND POWDER COATING RESINOUS COMPOSITION CONTAINING THE SAME

[75] Inventors: Hisaki Tanabe, Kyoto; Ryozo Takagawa; Yoshio Eguchi, both of Osaka, all of Japan

[73] Assignee: Nippon Paint Co., Ltd., Osaka, Japan

[21] Appl. No.: 560,226

[22] Filed: Jul. 20, 1990

Related U.S. Application Data

[63] Continuation-in-part of Ser. No. 262,734, Oct. 12, 1988, abandoned.

[30] Foreign Application Priority Data

Oct. 12, 1987 [JP] Japan ................... 62-256488
Oct. 12, 1987 [JP] Japan ................... 62-256489
Feb. 29, 1988 [JP] Japan ................... 63-48412
Jun. 1, 1988 [JP] Japan ................... 63-135169

[51] Int. Cl.$^5$ ............................................. C08G 63/00
[52] U.S. Cl. ................................. 528/308; 528/272;
528/296; 528/298; 528/299; 528/302;
528/308.1; 528/308.6; 525/418; 525/450;
525/534
[58] Field of Search ............... 528/272, 296, 298, 299,
528/302, 308, 308.1, 308.6; 525/418, 450, 534

[56] References Cited

U.S. PATENT DOCUMENTS 3,956,228  5/1976  Nogami et al.
4,352,924 10/1982  Wooten et al. .................. 528/302
4,356,285 10/1982  Kumagai ......................... 525/111
4,397,979  8/1983  Reimschuessel .................. 524/413

OTHER PUBLICATIONS

Derwent Abstract: JP 57198726.

Primary Examiner—John Kight, III
Assistant Examiner—S. A. Acquah
Attorney, Agent, or Firm—Wenderoth, Lind & Ponack

[57] ABSTRACT

The invention concerns a thermosetting polyester resin capable of forming an anisotropic molten phase comprising a repeating unit of the formula: A-X-B alone, or a combination of the repeating unit of the formula: A-X-B and the repeating unit of the formula: R, adjoining two repeating units being connected each other through an ester bond, in which A represents a mesogenic group defined in the specification, B is a spacer group defined in the specification, X is an ester bond, and R represents a bivalent to hexavalent aliphatic, aromatic or alicyclic hydrocarbon residue, the end bondings of the connected repeating units being occupied by OH, COOH or their reactive derivatives and the sum of the resinous acid value and the OH value being 10 to 200.

The invention also provides a powder coating resinous composition containing the abovesaid resin.

2 Claims, No Drawings

THERMOSETTING POLYESTER RESIN AND POWDER COATING RESINOUS COMPOSITION CONTAINING THE SAME

This application is a continuation-in-part of now abandoned U.S. patent application Ser. No. 07/262,734 filed on Oct. 12, 1988 abandoned.

FIELD OF THE INVENTION

The present invention relates to a novel class of thermosetting polyester resin capable of forming an anisotropic molten phase and having hydroxyl and/or carboxyl functional groups and to a powder coating resinous composition containing the same.

BACKGROUND OF THE INVENTION

During these 20 years, various low molecular liquid crystalline materials have been synthesized and used as optical display elements for watches, computers, televisions and the like. Regarding to high molecular liquid crystalline materials, attention has been directed to studies on thermotropic liquid crystalline materials and especially on such resins as having improved strength and thermal resistance under normal conditions and being easily transformed to molten phase due to liquid crystal properties thereof, as in all aromatic polyester resins disclosed in Japanese Patent Application Kokai Nos. 54-50594 and 55-144024. Other high polymers having thermotropic liquid crystal properties have been stated in Eur. Polym. J. 16, 303, 1980 by D. Van Luyen et al, Polymer 24, 1299, 1983 and Kobunshi Kako 34, [1], 39, 1985 by W. R. Kringbaum and J. Watanabe. In these high polymers, liquid crystal properties (Optical anisotropic properties) are generated, as in low molecular liquid crystalline materials, by the repeating unit structure in the main chain comprising a stiff mesogenic group and a soft spacer group. Since the abovementioned main chain type, high molecular liquid crystalline materials have, in general, a large orientation time of molecular motion, they are not always suitable for a high response display application in contrast to low molecular liquid crystalline materials. However, research activities have been continued to apply them to thermal recording medium, wave-selective transmission or reflecting film and the like to make the most of their film-forming and filament forming properties.

However, heretofore proposed liquid crystal polyesters are all of thermoplastic nature. Their end groups are, in general, blocked ester bonds as acetyl, phenylester and the like. This is because if there exist end functional groups, the polyesters are liable to be pyrolized at the melting points as high as 250°~400° C. Their average molecular weights are also very high, e.g. tens of thousands to several hundred thousands, so as to be suitable for fluxing. Thus, the proposed polyesters do not contain any or any substantial quantities of end functional groups (if any, it is only in the level enough to give a resinous acid value of less than 10), and therefore they can not be used as a thermosetting resin for coating composition.

Under the circumstances, such polyester resin as being useful as a thermosetting resin and capable of forming an anisotropic molten phase at a lower melting point has been longed for, in paint industries.

In a coating composition area, a thermosetting polyester resin has become the object of public attention as the main constituting component of powder coating resinous composition.

Coating powders are usually prepared by mixing resinous component, pigment and other additives, kneading the mixture at an elevated temperature, cooling the mixture to a solid mass and pulverizing the same. Therefore, if the employed resinous component is of thermosetting nature, it must be stable at the melt-kneading stage, but fully cured by heating at the curing stage.

In considering powder coating resinous composition comprising a polyester resin and a melamine resin or blocked polyisocyanate compound, most of the polyester resins proposed for solvent type coating composition's are possessed of lower softening points and therefore, when powder coating is prepared with said resins, blocking of the powder is liable to occur during storage of said powder. When a polyester resin with a higher softening point is selected, such resin is easily gelated at the melt-kneading stage, and therefore, great difficulties are encountered in the preparation of coating powder. Even succeeded in obtaining the powder, there are problems of poor leveling and gloss of the formed coating.

In U.S. Pat. No. 4,352,924 and EP 0,070,118, are disclosed thermosetting powder coating compositions with crystalline polyesters prepared from terephthalic acid, isophthalic acid and 1,4-cyclohexane dicarboxylic acid as dicarboxylic acid components and 1,4-butanediol and 1,6-hexanediol as diol components. However, it is not yet up to the mark in the sense of striving for compatibility of blocking resistance of the powder and leveling of the formed coating.

Furthermore, powder coating comprising a carboxyl containing polyester resin and a polyepoxy compound has also been known in the art, as, for example, Japanese Patent Publication No. 55-15506 and Japanese Patent Publication No. 58-29342. Such powder coating is excellent in mechanical strength, adhesion and anticorrosion properties and therefore has been widely used in various technical fields. Finally, JP 57-198726 discloses polyesters derived from 4,4-diphenyl dicarboxylic acid and alkyleneglycol, but such polyesters are incapable of giving an anisotropic molten phase and, further, these polyesters have a transition point of 250° C. or more.

However, the disclosed powder coatings are all based on polyester resins with considerably higher acid values, e.g. 40~70, and therefore, there are problems of inferior storage stability of the powder and poor leveling of the formed coating.

It is, therefore, an object of the invention to provide a novel thermosetting polyester resin which can be used as a thermosetting resin in the field of coating composition and especially coating powder and can be transformed to an anisotropic molten phase at a considerably lower melting temperature. It is an additional object of the invention to provide a thermosetting resinous composition comprising the abovementioned polyester resin and a hardener, which can be used as the base material for coating powder. A further object is to provide coating powder which is free from undesired blocking during storage of the powder, easily prepared by a conventional method of melt kneading and capable of resulting in a coating with excellent leveling and gloss properties.

SUMMARY OF THE INVENTION

According to the invention, the abovementioned objects are attained by the provision of a thermosetting polyester resin comprising a repeating unit of the formula: A-X-B, wherein 100 to 50 mol % of A stands for a mesogenic group selected from a polyphenylene group in which 2 or more benzene rings are aligned and connected each other in their respective para-position, a polyphenylene group in which 2 or more benzene rings are aligned and connected each other in their respective para-position through azo, azoxy, azomethine, ester of trans-vinylene bond, or 2,6-naphthylene group, the remaining 50 mol % of A stands for a member selected from the group consisting of p-phenylene, m-phenylene, o-phenylene and trans 1,4-cyclohexylene; B is a spacer group represented by the formula: —(CH₂)ₙ— or

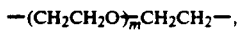

in which n is an integer of 2 to 20 and m is an integer of 1 to 19; and X is an ester bond, adjoining two repeating units being connected through an ester bond, end bondings of the connected repeating units being occupied by OH, COOH or their reactive derivatives, sum of resinous acid value and OH value being 10~200, and being capable of forming an anisotropic molten phase, or a thermosetting polyester resin comprising a combination of a repeating unit of the formula:

A-X-B        [I], wherein 100 to 50 mol % of A stands for a mesogenic group selected from a polyphenylene group in which 2 or more benzene rings are aligned and connected each other in their respective para-position, a polyphenylene group in which 2 or more benzene rings are alined and connected each other in their respective para-positions through an azo, azoxy, ester or trans-vinylene bond, or a 2,6-naphthylene group, the remaining 50 mol % of A stands for a member selected from the group consisting of p-phenylene, m-phenylene, o-phenylene and trans 1,4-cyclohexylene; B is a spacer group represented by the formula: —(CH₂)ₙ— or

in which n is an integer of 2 to 20 and m is an integer of 1 to 19; and X is an ester bond, and a repeating unit of the formula: R . . . [II], wherein R stands for bivalent to hexavalent aliphatic, aromatic or alicyclic hydrocarbon residue which may include up to 4 OH and/or COOH group, the weight ratio of said units (I) to units (II) being 99.9:0.1~70:30, adjoining two repeating units placed in random order being connected through an ester bond, end bondings of the connected repeating units being occupied by OH, COOH or their reactive derivatives, sum of resinous acid value and OH value being 30-150, and being capable of forming an anisotropic molten phase.

In this invention, are also provided a powder coating reainous composition comprising either type of the abovementioned polyester resins wherein the end bondings are HO or its reactive derivative and the resinous OH value is 20~200, and blocked isocyanate compound or aminoplast resin, and a powder coating resinous composition comprising either type of the abovementioned polyester resins wherein the end bondings are carboxyl, hydroxyl or methyl ester groups and the resinous acid value in 15~100, and a polyepoxy compound or resin having 2 or more epoxy groups in the molecule.

The first type of the present polyester resin comprises a repeating unit of the formula: A-X-B, adjoining two repeating units being connected through an ester bond, end bondings of the connected repeating units being occupied by OH, COOH or their reactive derivatives, the sum of resinous acid value and OH value being 10~200 and being capable of forming an anisotropic molten phase.

Such resin has a main chain type, high molecular liquid crystalline structure in which mesogenic groups (A) and spacer groups (B) are alternately arranged and connected with each other through an ester bond, and cross-linkable functional groups as OH or COOH are contained in a higher concentration in the resin as end bondings. In that sense, the present resin is clearly distinguished from the heretofore proposed main chain type, high molecular liquid crystalline materials.

Speaking of the constituting component (A) of the present polyester resin, 100 to 50 mol % of said (A) must be a mesogen group selected from the group consisting, of a polyphenylene group in which 2 or more benzene rings are alined and connected each other in their respective para-position, as, for example, 4,4'-biphenylene

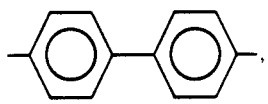

4,4''-p-terphenylene

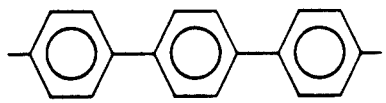

and the like; a polyphenylene group in which 2 or more benzene rings are alined and connected each other in their respective para-position through azo, azoxy, azomethine, ester or transvinylene bond, as, for example

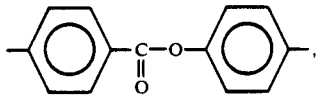

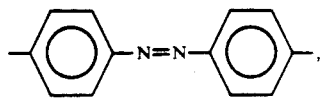

-continued

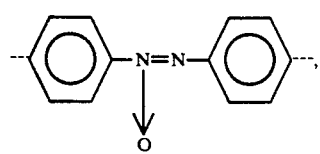

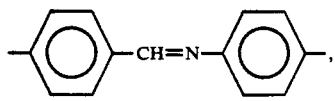

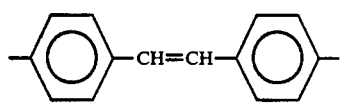

and the like; and 2,6-naphthylene group. The remaining less than 50 mol % may be such member as p-phenylene, m-phenylene, o-phenylene or trans-1,4-cyclohexylene group. Since the component (A) is advantageously incorporated into the polyester resin as a polybasic acid component or a polyhydric alcohol component, said component (A) may preferably be derived from the compounds whose end groups are either member of carboxyl group, carboxylic ester group, acid chloride, hydroxyl group and acetyl group.

Typical compounds are as follows:

For a mesogenic group:

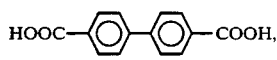

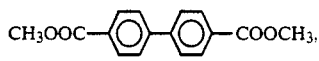

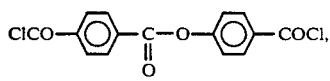

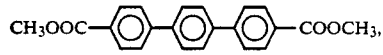

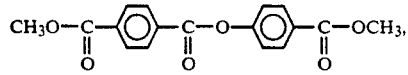

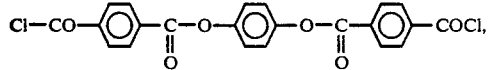

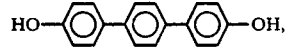

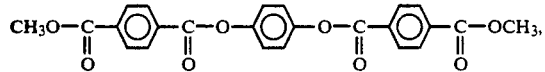

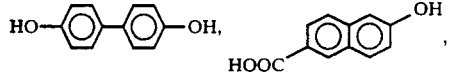

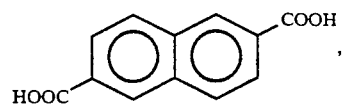

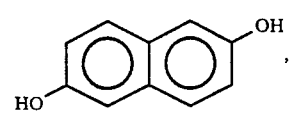

For other than mesogenic group:

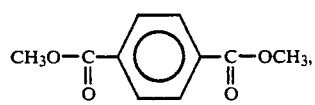

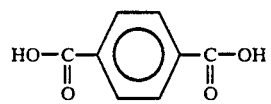

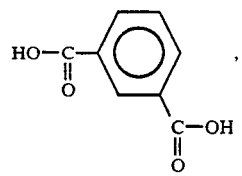

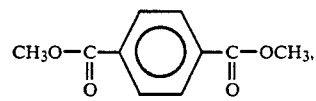

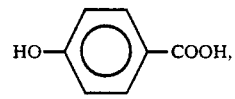

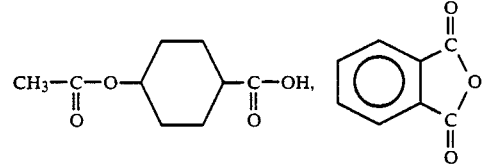

These are only examples of the compounds which are used in this invention for the introduction of said A component and the invention can never be limited to the same.

The spacer component (B) may be represented by either formula:

—(CH$_2$)$_n$—  or  —(CH$_2$CH$_2$O)$_m$CH$_2$CH$_2$—.

This spacer component (B) should be connected to the aforesaid, (A) component and to the neighboring A-X-B unit through an ester bond. Therefore, the starting materials to be used for the introduction of said (B) should preferably be ended by OH, COOH or their reactive derivatives. Examples of such materials are as follows:

Compounds with —(CH$_2$)$_n$— group:
 ethylene glycol, 1,3-propanediol, 1,4-butanediol, 1,5-pentanediol, 1,6-hexanediol, 1,8-octanediol, 1,9- nonanediol, 1,10-decanediol, 1,12-dodecanediol, adipic acid, sebacic acid, azelaic acid, and other aliphatic dicarboxylic acids and the like.

Compounds with

group:

diethyleneglycol, triethyleneglycol, tetraethylene glycol and the like.

This type of polyester resins can be easily prepared in a conventional way, i.e. by the reaction of polybasic acids and polyhydric alcohols which are suitable for the introduction of said A and B components into the resins.

Usually, excess amounts of polyhydric alcohols are used with the polybasic acids and esterification or ester exchange reaction may be carried out at a temperature of 130°~300° C., preferably under inert gas stream as nitrogen gas and in the presence of esterification catalyst or ester exchange catalyst. Examples of such catalysts are oxides or acetates of such metals as lead, zinc, manganese, barium, calcium, magnesium, lithium, germanium, antimony and the like, p-toluene sulfonic acid, alkyl titanates, organic tin compounds and the like. When used, the amount of such catalyst is preferably determined in a range of 0.01 to 0.5% by weight of the acid component used.

When an excess amount of polyhydric alcohol is used, a polyester resin having end hydroxyl groups results therefrom and such polyester resin may be further reacted with an acid anhydride to give a polyester with end carboxyl groups, as desired. It is, of course, possible to carry out the original esterification using an excess amount of acid component, and however, at that time, considerable difficulties are encountered in carrying out a uniform esterification because of limited solubility or sublimation tendency of the selected acid component. There always remains certain amounts of unreacted acid in the produced resin. Therefore, the said esterification is, in general, carried out by using an excess amount of polyhydric alcohol component as already stated herein before.

The thus obtained polyester resin is characterized in that the polymer chain is composed of a repeating unit comprising a comparatively rigid, planar structural mesogenic group (A) connected through an ester bond to a flexible spacer group (B), adjoining two repeating units are connected to each other through an ester bond, the end groups are OH, COOH or their reactive derivatives, and the sum of the resinous acid value and OH value is 10~200, preferably 20~100.

Therefore, the resin can exhibit enough thermosetting properties. As to the molecular weight, though it may be widely varied with the employed constituting elements, it is usually in a range of 500 to 20,000 in terms of number average molecular weight (polystyrene conversion). The phase transition point is usually in a range of about 80° to 230° C.

If desired, less than 50 mol % of said mesogenic group (A) may be substituted with p-phenylene, m-phenylene, o-phenylene or 1,4-cyclohexylene group, without the fear of losing the desired liquid crystalline properties. The second type of the present polyester resin comprises a repeating unit (I) of the formula: A-X-B in which A, B and X are as defined above, and a repeating unit (II) of the formula: R in which R is as defined hereinbefore, said unit (I) and unit (II) being contained in the weight ratio of (I)/(II)=99.9/0.1~70/30, arranged in any random order and connected to each other through an ester bond, the end groups being OH, COOH or their reactive derivatives, the sum of resinous acid value and OH value being 10~200 and capable of forming an anisotropic molten phase.

In this type of resin, the meaning of mesogenic group A, spacer group B and the starting materials to be used for the introduction of said A and said B are the same as those of the first type polyester resin.

This resin is characterized in that besides the repeating unit of the formula: A-X-B (I), a second repeating unit (II) of the formula: R, i.e. bivalent to hexavalent aliphatic, aromatic or alicyclic residue which may contain up to 4 OH and/or COOH groups, is included in the weight ratio of said (I) to (II) of 99.9/0.1~70/30. Since a number of repeating units (I) of the formula: A-X-B and the repeating units (II) of the formula: R are alined in any successive order in the chain and connected each other through an ester bond, R must be bonded to the neighboring A, B or R through an ester bond, and therefore, the starting material used for the introduction of said R unit should preferably have at least two functional groups capable of participating in the formation of said ester bonding, as, for example, OH and COOH.

Examples of such materials are neopentylglycol, dimethylol propionic acid, 1,4-cyclohexanedimethanol, trimethylol ethane, trimethylol propane, glycerine, pentaerythritol, sorbitol and other similar alcohols; phthalic anhydride, trimellitic anhydride, pyromellitic anhydride, tetrachlorophthalic anhydride, tetrafluorophthalic anhydride, p-hydroxy benzoic acid, hexahydrophthalic anhydride, 3-methylhexahydrophthalic acid, 4-methylhexahydrophthalic acid and other similar acids.

This type of polyester resin may be advantageously prepared by using appropriate alcohols and acids which are suitable for the introduction of said A, B and R components, and following the conventional way as in the first type of the present polyester resin.

The thus obtained polyester resin is characterized in that the polymer chain is composed of a repeating unit (I) comprising a comparatively rigid, planar structural mesogenic group (A) connected through an ester bond to a flexible spacer group (B) and a repeating unit (II) of the formula: R, which is a hydrocarbon residue used for the control of film properties, the weight ratio of said unit (I) to unit (II) being settled, from the standpoint of the liquid crystalline properties and film properties desired, in a range of 99.9/0.1~70/30, adjoining two repeating units are connected each other through an ester bond, the end groups are OH, COOH or their reactive derivatives and the sum of resinous acid value and hydroxyl value in 10~200, and preferably 30~150. Therefore, the resin can exhibit sufficient thermosetting properties. As to the molecular weight, it may be widely varied with the employed constituting elements and however, it is usually in a range of 500 to 10,000 in terms of number average molecular weight (polystyrene conversion). The phase transition point is usually in a range of about 80° to 230° C.

If desired, less than 50 mol % of said mesogenic group (A) may be substituted with a p-phenylene, m-phenylene, o-phenylene or 1,4-cyclohexylene group, without the fear of losing the desired liquid crystalline properties.

In either type of the abovementioned polyester resins, they are solid at room temperatures and excellent in storage satbility. Since a number of hydroxyl or carboxyl groups are included, they are used, together with a polyisocyanate compound or aminoplast resin or glycidyl bearing compound, for the preparation of thermosetting type coating compositions.

Furthermore, since they are liquid crystalline materials, the thus obtained coating compositions are excellent in flowability at the baking stage and can result in coatings with excellent gloss and appearance.

To make the most of the abovementioned characteristic features, the invention provides a powder coating resinous composition containing the present polyester resin. The present powder coating resinous compositions are classified in the following two groups depending on the type of hardener co-used. That is, the first type of powder coating resinous composition comprises a polyester resin comprising a repeating unit (I) of the formula: A-X-B (I) or a combination of the repeating unit (I) and a repeating unit (II) of the formula: R ... (I), wherein 100 to 50 mol % of A stands for a mesogenic group selected from a polyphenylene group in which 2 or more benzene rings are alined and connected each other in their respective para-position, a polyphenylene group in which 2 or more benzene rings are alined and connected to each other in their respective para-positions through an azo, azoxy, ester or trans-vinylene bond, or a 2,6-naphthylene group, the remaining 50 mol % of A stands for a member selected from the group consisting of p-phenylene, m-phenylene, o-phenylene and trans 1,4-cyclohexylene; B is a spacer group represented by the formula: —$(CH_2)_n$— or

in which n is an integer of 2 to 20 and m is an integer of 1 to 19; X is an ester bond, and R stands for bivalent to hexavalent aliphatic, aromatic or alicyclic hydrocarbon residue which may include up to 4 OH and/or COOH group, the weight ratio of said units (I) to units (II) being 99.9:0.1~70:30, adjoining two repeating units placed in random order being connected through an ester bond, the end bondings of the connected repeating units being occupied by OH or its reactive derivatives, the resinous OH value being 20~200, and being capable of forming an anisotropic molten phase and (b) a blocked isocyanate compound or an amino-plast resin. The hydroxyl value of the polyester resin is preferably controlled in a range of 30~100 so as to give the optimum thermosetting and film properties. The number average molecular weight of the polyester resin is selected to be in a range of 500~10,000 and preferably 500~4,000.

Since the polyester resin is solid at room temperatures and contains a number of crystalline, rigid mesogenic groups, when combined with a blocked polyisocyanate compound or an aminoplast resin, the thus obtained resinous composition may be stably stored without any undesired blocking thereof. The reactivity of the polyester resin with the selected hardener is excellent because of the higher hydroxyl value. Since the resin can be converted to a low viscous liquid phase at once when applied heating (i.e. liquid crystalline properties), the composition can result in an amorphous, clear coating with an excellent appearance.

Furthermore, since the polyester resin includes a flexible spacer group and a hydrocarbon residue R which is useful as a film modifier, the thus formed coating is excellent in bending processability and other film properties. Thus, the composition is very useful as a resinous composition for a coating powder.

The compounding ratio of said polyester resin and polyisocyanate compound or aminoplast resin, compounding means and preparation of powder coating are not of specific and any conventional techniques may be satisfactorily used. The second type of the present powder coating resinous composition comprises (a) a polyester resin comprising a repeating unit (I) of the formula: A-X-B ... (I) or a combination of the repeating unit (I) and a repeating unit (II) of the formula: R ... (II), wherein 100 to 50 mol % of A stands for a mesogenic group selected from a polyphenylene group in which 2 or more benzene rings are alined and connected to each other in their respective para-positions, a polyphenylene group in which 2 or more benzene rings are alined and connected with each other in their respective para-position through an azo, azoxy, ester or a trans-vinylene bond, or 2,6-naphthylene group, the remaining 50 mol % of A stands for a member selected from the group consisting of p-phenylene, m-phenylene, o-phenylene and trans 1,4-cyclohexylene; B is a spacer group represented by the formula —$(CH_2)_n$— or

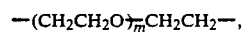

in which n is an integer of 2 to 20 and m is an integer of 1 to 19; X is an ester bond, and R stands for a bivalent to hexavalent aliphatic, aromatic or alicyclic hydrocarbon residue which may include up to 4 OH and/or COOH group, the weight ratio of said units (I) to units (II) being 99.9:0.1~70:30, adjoining two repeating units placed in random order being connected through an ester bond, end bondings of the connected repeating units being occupied by OH, COOH or methylester group, resinous acid value being 15~100, and being capable of forming an anisotropic molten phase and (b) a compound or resin having at least 2 epoxy groups in the molecule thereof.

The resinous acid value of said polyester resin should be controlled in a range of 15~100, more preferably 30~70. This is because, if the resinous acid value is less than 15, there is a tendency that the mechanical strength of the coating be lowered, and if the resinous acid value exceeds the upper limit of 100, the storage stability of the composition is lowered, resulting in undesired blocking of the composition and uneven coating therefrom.

As to the molecular weight of the polyester resin, it may be widely varied with the employed constituting elements and however, the number average molecular weight (polystyrene conversion) is, most preferably, in a range of 500~4,000. The phase transition point should preferably be in a range of about 60°~180° C.

Examples of the compound or resin having at least 2 epoxy groups are diglycidyl ethers of bisphenol A, diglycidyl ethers of bisphenol F, glycidyl esters and glycidyl polyglycidyl ethers of polyhydric alcohols as diglycidyl ethers of ethyleneglycol and triglycidyl ethers of trimethylol propane, diglycidyl esters of dibasic acids, such as the diglycidyl ester of terephthalic acid, the triglycidyl isocyanurate and the like. The compounding ratio of said polyester resin and epoxy compound or resin may be appropriately selected in a conventional way, in due consideration of the amounts of functional groups carried with these components.

Since the polyester resin is solid at room temperatures and contains a number of crystalline, rigid mesogenic groups, when combined with a polyepoy compound or resin, the thus obtained resinous composition may be stably stored without any undesired blocking thereof.

The reactivity of the polyester resin with the selected hardener is excellent because of its higher acid value. Since the resin can be converted to a low viscous liquid phase at once when applied heating (i.e. liquid crystalline properties), the composition can result in an amorphous, clear coating with an excellent appearance.

Furthermore, since the polyester resin includes a flexible spacer group and a hydrocarbon residue R which is useful as a film modifier, the thus formed coating is excellent in bending processability and other film properties. Thus, the composition is very useful as a resinous composition for a coating powder.

The invention shall be now more fully explained in the following Examples. Unless otherwise being stated, all parts and percentages are by weight.

EXAMPLE 1

Into a reaction vessel fitted with a heating device, a stirrer, a nitrogen gas inlet tube and a fractionating column, were placed 10 mols of dimethylester of 4,4-diphenyl carboxylic acid, 11 mols of 1,9-nonanediol and 2.2 g of dilutyl tin oxide and the mixture was heated under nitrogen gas stream to obtain a melt. Then, an ester exchange reaction was carried out at 130° to 230° C. while removing the formed methanol out of the system.

After collecting 760 ml of methanol, the mixture was reacted at 230° C. under 10 mmHg for additional 1 hour to complete the ester exchange reaction.

Thus obtained polyester resin (1) had a hydroxyl value of 25 and a number average molecular weight (polystyrene conversion, measured by GPC of column temperature 135° C. and trichlobenzene solvent) of 6,800.

When the polyester was heated at a rate of 10° C. per minute by using a differential scanning calorimetry, there was a sharp and large endothermic peak at about 148° C. and when cooled at a rate of 10° C. per minute, a sharp and large exothermic peak at about 116° C.

The resin was then examined by using a microscope equipped with a heating stage under crossed nicols and specific texture due to optical anisotropic property was clearly observed.

Thus obtained thermosetting polyester resin (1) capable of forming an anisotropic molten phase and CRELAN UI ($\epsilon$-caprolactam blocked IPDI, NXO equivalent 365, trademark of Bayer) were compounded in a OH/NCO equivalent ratio of 1/1 and dibutyl tin dilaurate was added thereto as a curing catalyst in an amount corresponding to 1.0 wt % of the total solid.

The mixture was then heat-melted at 150° C., allowed to cool to solidify the same and then pulverized to powder having a mean diameter of 10$\mu$ or less. The powder was coated onto a tin plate and baked at 230° C. for 20 minutes. Thus obtained coating was clear and had a smooth surface. The polyester resin was thus proven to be useful as a thermosetting resin in powder coating.

Test results are shown in Table 1.

EXAMPLE 2

100 parts of the polyester (1) obtained in Example 1 were placed in a reaction vessel and while heating the polyester at 150° C. under dried nitrogen gas and maintaining it at a molten state, 6.65 parts of phthalic anhydride were added thereto and the mixture was reacted at the same temperature for 1 hour to obtain a polyester resin (2). Thus obtained polyester had a hydroxyl value of 1.0, an acid value of 22.0, and a number average molecular weight (polystyrene conversion, measured by GPC of column temperature 135° C. and trichlorbenzene solvent) of 7,100.

When the polyester was heated at a rate of 10° C. per minute by using a differential scanning calorimetry, there was a sharp and large endothermic peak at 148° C. and when cooled at a rate of 10° C. per minute, a sharp and large exothermic peak at 108° C.

The resin was then examined by using a microscope equipped with a heating stage under crossed nicols and specific texture due to optical anisotropic property was clearly observed.

Thus obtained thermosetting polyester resin (2) capable of forming an anisotropic molten phase and EPOTOHTO YD-011 (epoxy resin, epoxy equivalent 475, trademark of Tohto Kasei) were compounded in a OH-/epoxy equivalent ratio of 1/1.

The mixture was then heat-melted at 130° C., allowed to cool to solidify the same and pulverized to powder having a mean diameter of 10$\mu$ or less.

The powder was coated onto a tin plate and baked at 230° C. for 20 minutes.

Thus obtained coating was evaluated as in Example 1 and the results were shown in Table 1.

EXAMPLE 3

Into a reaction vessel, were placed 3 mols of dimethyl ester of 4,4'-diphenyl carboxylic acid, 4 mols of 1,9-nonanediol and 0.8 g of dibutyl tin oxide and the mixture was heated under nitrogen gas stream to obtain a melt. Then, an ester exchange reaction was carried out at 130° to 230° C. while removing the formed methanol out of the system.

After collecting 230 ml of methanol, the mixture was reacted at 230° C. under 10 mmHg for additional 1 hour to complete the ester exchange reaction.

Thus obtained polyester had a hydroxyl value of 82, and a number average molecular weight (polystyrene conversion, measured by GPC of column temperature 135° C. and trichlorbenzene solvent) of 1,550.

When the polyester was heated at a rate of 10° C. per minute by using a differential scanning calorimetry, there was a sharp and large endothermic peak at about 138° C. and when cooled at a rate of 10° C. per minute, a sharp and large exothermic peak at about 95° C.

The resin was then examined by using a microscope equipped with a heating stage under crossed nicols and specific texture due to optical anisotropic property was clearly observed.

Thus obtained thermosetting polyester resin (3) was evaluated as in Example 1 and the test results were shown in Table 1.

EXAMPLE 4

100 parts of the polyester (3) obtained in Example 3 were placed in a reaction vessel and while heating the polyester at 150° C. under dried nitrogen gas and maintaining it at a molten state, 21.7 parts of phthalic anhydride were added thereto and the mixture was reacted at the same temperature for 1 hour to obtain a polyester resin (4). Thus obtained polyester had a hydroxyl value of 1.5, an acid value of 68.5, and a number average molecular weight (polystyrene conversion, measured by GPC of column temperature 135° C. and trichlorbenzene solvent) of 1,830.

When the polyester was heated at a rate of 10° C. per minute by using a differential scanning calorimetry, there was a sharp and large endothermic peak at about 135° C. and when cooled at a rate of 10° C. per minute, a sharp and large exothermic peak at about 96° C.

The resin was then examined by using a microscope equipped with a heating stage under crossed nicols and specific texture due to optical anisotropic property was clearly observed.

Thus obtained thermosetting polyester resin (4) was evaluated as in Example 2 and the results were shown in Table 1.

EXAMPLE 5

Into a reaction vessel, were placed 7 mols of dimethyl ester of 4,4'-diphenyl carboxylic acid, 8 mols of 1,8-octanediol and 1.5 g of dibutyl tin oxide and the mixture was heated under nitrogen gas stream to obtain a melt. Then, an ester exchange reaction was carried out at 130° to 230° C. while removing the formed methanol out of the system.

After collecting 530 ml of methanol, the mixture was reacted at 230° C. under 10 mmHg for an additional 1 hour to complete the ester exchange reaction.

Thus obtained polyester (5) had a hydroxyl value of 37, and a number average molecular weight (polystyrene conversion, measured by GPC of column temperature 135° C. and trichlorbenzene solvent) of 4,000.

When the polyester was heated at a rate of 10° C. per minute by using a differential scanning calorimetry, there was a sharp and large endothermic peak at about 180° C. and when cooled at a rate of 10° C. per minute, a sharp and large exothermic peak at about 173° C.

The resin was then examined by using a microscope equipped with a heating stage under crossed nicols and specific texture due to optical anisotropic property was clearly observed.

Thus obtained thermosetting polyester resin (5) was evaluated as in Example 1 and the results were shown in Table 1.

EXAMPLE 6

Into a reaction vessel, were placed 7 mols of dimethyl ester of 4,4'-diphenyl carboxylic acid, 8 mols of 1,6-hexanediol and 1.5 g of dibutyl tin oxide and the mixture was heated under nitrogen gas stream to obtain a melt. Then, an ester exchange reaction was carried out at 130° to 230° C. while removing the formed methanol out of the system.

After collecting 530 ml of methanol, the mixture was reacted at 230° C. under 10 mmHg for additional 1 hour to complete the ester exchange reaction.

Thus obtained polyester (6) had a hydroxyl value of 40, and a number average molecular weight (polystyrene conversion, measured by GPC of column temperature 135° C. and trichlorbenzene solvent) of 4,250.

When the polyester was heated at a rate of 10° C. per minute by using a differential scanning calorimetry, there was a sharp and large endothermic peak at about 215° C. and when cooled at a rate of 10° C. per minute, a sharp and large exothermic peak at about 180° C.

The resin was then examined by using a microscope equipped with a heating stage under crossed nicols and specific texture due to optical anisotropic property was clearly observed.

Thus obtained thermosetting polyester resin (6) was evaluated as in Example 1 and the results were shown in Table 1.

EXAMPLE 7

Into a reaction vessel, were placed 8 mols of dimethyl ester of 4,4'-diphenyl carboxylic acid, 2 mols of dimethyl terephthalate, 11 mols of 1,9-nonanediol and 2.2 g of dibutyl tin oxide and the mixture was heated under nitrogen gas stream to obtain a melt. Then, an ester exchange reaction was carried out at 130° to 230° C. while removing the formed methanol out of the system.

After collecting 745 ml of methanol, the mixture was reacted at 230° C. under 10 mmHg for additional 1 hour to complete the ester exchange reaction.

Thus obtained polyester (7) had a hydroxyl value of 26, and a number average molecular weight (polystyrene conversion, measured by GPC of column temperature 135° C. and trichlorbenzene solvent) of 6,100.

When the polyester was heated at a rate of 10° C. per minute by using a differential scanning calorimetry, there was a sharp and large endothermic peak at about 125° C. and when cooled at a rate of 10° C. per minute, a sharp and large exothermic peak at about 83° C.

The resin was then examined by using a microscope equipped with a heating stage under crossed nicols and specific texture due to optical anisotropic property was clearly observed.

Thus obtained thermosetting polyester resin (7) was evaluated as in Example 1 and the results were shown in Table 1.

EXAMPLE 8

Into a reaction vessel, were placed 6 mols of dimethyl ester of 4,4'-diphenyl carboxylic acid, 4 mols of dimethyl ester of terephthalic acid, 11 mols of 1,9-nonanediol and 2.0 g of dibutyl tin oxide, and the mixture was heated under dried nitrogen gas to produce a melt. Ester exchange reaction was carried out at 130° to 230° C. while removing the formed methanol out of the system.

After collecting 760 ml of methanol, the mixture was further heated at 230° C. and under 10 mmHg pressure for 1 hour to complete the ester exchange reaction.

Thus obtained polyester resin (8) had a hydroxyl value of 27 and a number average molecular weight (polystyrene conversion, measured by GPC using column temperature 135° C. and trichlorbenzene solvent) of 5,900.

When the polyester was heated at a rate of 10° C. per minute by using a differential scanning calorimetry, there was a sharp and large endothermic peak at about 95° C. and when cooled at a rate of 10° C. per minute, a broad exothermic peak at about 83° C.

The resin was then examined by using a microscope equipped with a heating stage under crossed nicols and specific texture due to optical anisotropic property was clearly observed.

Thus obtained thermosetting polyester resin was then evaluated as in Example 1 and the test results were shown in Table 1.

EXAMPLE 9

Into a reaction vessel, were placed a mixed solvent of 1,000 g toluene and 100 g pyridine, and then 0.5 mol of 2,6-naphthalene dicarboxylic chloride, and 0.55 mol of 1,9-nonanediol and the mixture was heated under dried nitrogen gas and reacted at 100° C. until the absorption peak at 1780cm$^{-1}$ (carboxylic chloride) in IR spectrum had disappeared to obtain a polyester resin (9).

Thus obtained polyester had a hydroxyl value of 30 and a number average molecular weight (polystyrene conversion, measured by GPC of column temperature 135° C. and trichlorbenzene solvent) of 4,900.

When the polyester was heated at a rate of 10° C. per minute by using a differential scanning calorimetry, there was a sharp and large endothermic peak at about 105° C. and when cooled at a rate of 10° C. per minute, a sharp and large exothermic peak at about 68° C.

The resin was then examined by using a microscope equipped with a heating stage under crossed nicols and specific texture due to optical anisotropic property was clearly observed.

Thus obtained thermosetting polyester resin was then evaluated as in Example 1 and the test results were shown in Table 1.

EXAMPLE 10

Into a reaction vessel, were placed a mixed solvent of 1,000 g toluene and 100 g pyridine, and then 0.5 mol of 4-(4'-(carbonyl chloride) benxoyloxy) benzoic acid chloride and 0.55 mol of 1,9-nonanediol and the mixture was heated under dried nitrogen gas and reacted at 100° C. until the absorption peak at 1780cm$^{-1}$ (carboxylic chloride) in IR spectrum had disappeared to obtain a polyester resin (10). Thus obtained polyester had a hydroxyl value of 27, and a number average molecular weight (polystyrene conversion, measured by GPC of column temperature 135° C. and trichlorbenzene solvent) of 5,300.

When the polyester was heated at a rate of 10° C. per minute by using a differential scanning calorimetry, there was a sharp and large endothermic peak at 165° C. and when cooled at a rate of 10° C. per minute, a sharp and large exothermic peak at 134° C.

The resin was then examined by using a microscope equipped with a heating stage under crossed nicols and specific texture due to optical anisotropic property was clearly observed.

Thus obtained thermosetting polyester resin was then evaluated as in Example 1 and the results were shown in Table 1.

COMPARATIVE EXAMPLE 1

Into a reaction vessel, were placed 20 mols of dimethyl ester of 4,4'-diphenyl carboxylic acid, 21 mols of 1,6-hexanediol and 5.0 g of dibutyl tin oxide, and the mixture was heated under dried nitrogen gas to get a melt.

Ester exchange reaction was carried out at 130° to 230° C. while removing the formed methanol out of the system.

After collecting 1,500 ml of methanol, the mixture was further heated at 230° C. and under 1 mmHg pressure for 5 hour to complete the ester exchange reaction.

Thus obtained polyester had a hydroxyl value of 5 and a number average molecular weight (polystyrene conversion, measured by GPC of column temperature 135° C. and trichlorbenzene solvent) of 28,000.

When the polyester was heated at a rate of 10° C. per minute by using a differential scanning calorimetry, there was a sharp and large endothermic peak at about 215° C. and when cooled at a rate of 10° C. per minute, a sharp and large exothermic peak at 180° C.

The resin was then examined by using a microscope equipped with a heating stage under crossed nicols and specific texture due to optical anisotropic property was clearly observed.

Thus obtained thermosetting polyester resin (A) was then evaluated as in Example 1.

It was found that the cured coating was a turbid, brittle coating and there were many fine particles therein.

The test results are also shown in Table 1.

COMPARATIVE EXAMPLE 2

Into a reaction vessel, were placed 10 mols of dimethyl ester of 4,4'-diphenyl carboxylic acid, 11 mols of 1,4-butanediol and 2.0 g of dibutyl tin oxide, and the mixture was heated under dried nitrogen gas to get a melt. Ester exchange reaction was carried out at 130° to 270° C. while removing the formed methanol out of the system.

After collecting 745 ml of methanol, the mixture was further heated at 270° C. and under 10 mmHg pressure for 1 hour to complete the ester exchange reaction.

Thus obtained polyester resin (B) had a hydroxyl value of 34, and a number average molecular weight (polystyrene conversion, measured by GPC using column temperature 135° C. and trichlorbenzene solvent) of 4,400.

When the polyester was heated at a rate of 10° C. per minute by using a differential scanning calorimetry, there was a sharp and large endothermic peak at about 255° C. and when cooled at a rate of 10° C. per minute, a broad exothermic peak at about 245° C.

The resin was then examined by using a microscope equipped with a heating stage under crossed nicols and specific texture due to optical anisotropic property was clearly observed.

Thus obtained thermosetting polyester resin was then evaluated as in Example 1.

It was found that the resin could not be melted out and remained as particles.

The results are shown in Table 1.

COMPARATIVE EXAMPLE 3

Into a reaction vessel, were placed 2 mols of dimethyl ester of 4,4'-diphenyl carboxylic acid, 8 mols of dimethyl ester of terephthalic acid, 11 mols of 1,9-nonanediol and 2.0 g of dibutyl tin oxide, and the mixture was heated under dried nitrogen gas to get a melt. Ester exchange reaction was carried out at 130+ to 230° C. while removing the formed methanol out of the system.

After collecting 745 ml of methanol, the mixture was further heated at 230° C. and under 10 mmHg pressure for 1 hour to complete the ester exchange reaction.

Thus obtained polyester resin (C) had a hydroxyl value of 8 and a number average molecular weight (polystyrene conversion, measured by GPC using column temperature 135° C. and trichlorbenzene solvent) of 3,940.

When the polyester was heated at a rate of 10° C. per minute by using a differential scanning calorimetry, there was no definite endothermic peak and when cooled at a rate of 10° C. per minute, no definite exothermic peak.

The resin was then examined by using a microscope equipped with a heating stage under crossed nicols but no specific texture due to optical anisotropic property was observed.

This resin was of amorphous nature and no phase transition point was observed.

EXAMPLE 11

Into a reaction vessel, were placed 7 mols of dimethyl ester of 1,10-decanedicarboxylic acid, 8 mols of 4,4'-biphenol and 1.5 g of dibutyl tin oxide, and the mixture was heated under dried nitrogen gas to get a melt. Ester exchange reaction was carried out at 130° to 250° C. while removing the formed methanol out of the system.

After collecting 500 ml of methanol, the mixture was further heated at 250° C. and under 10 mmHg pressure for 2 hours to complete the ester exchange reaction.

The reaction mixture was allowed to cool and 1,000 g of N-methylpyrolidone were dropwise added at 200° C. and below.

To this mixture, 295 g of phthalic anhydride were added while keeping the temperature at 150° C. and the combined mixture was reacted at 150° C. for 1 hour and then dropwise added to a separate tank containing 5,000 ml of toluene. The precipitated resin was separated by filtration.

Thus obtained polyester resin (11) had a hydroxyl value of 0.1, an acid value of 35 and a number average molecular weight (polystyrene conversion, measured by GPC using column temperature 135° C. and tri chlorbenzene solvent) of 4,680.

When the polyester was heated at a rate of 10° C. per minute by using a differential scanning calorimetry, there was a sharp and large enothermic peak at about 205° C. and when cooled at a rate of 10° C. per minute, a broad exothermic peak at about 183° C.

The resin was then examined by using a microscope equipped with a heating stage under crossed nicols and specific texture due to optical anisotropic property was clearly observed.

Thus obtained thermosetting polyester resin was then evaluated as in Example 2 and the test results were shown in Table 1.

TABLE 1

| | Example | | | | | | | |
|---|---|---|---|---|---|---|---|---|
| | 1 | 2 | 3 | 4 | 5 | 6 | 7 | 8 |
| Cured coating | clear | clear | clear | clear | clear | clear | clear | clear |
| flatness of film* | ○ | ○ | ○ | ○ | ○ | Δ | ○ | ○ |

| | Example | | | Comp. Exam. | |
|---|---|---|---|---|---|
| | 9 | 10 | 11 | 1 | 2 |
| Cured coating | slightly turbid | clear | slightly turbid | turbid no continuous film | turbid no continuous film |
| flatness of film* | Δ | ○ | ○ | X | X |

*:○ ... flat
Δ ... slight roughness
X ... no continuous film, many particles.

EXAMPLE 12

Into a reaction vessel, were placed 7 mols of dimethyl ester of 4,4'-diphenyl carboxylic acid, 7 mols of 1,8-octanediol, 1 mol of diethyleneglycol and 1.5 g of dibutyl tin oxide and the mixture was heated under dried nitrogen gas to get a melr. Ester exchange reaction was carried our at 130°~230° C. while removing the formed methanol out of the system.

After collecting 530 ml of methanol, the content was further reacted at 230° C. under 10 mmHg pressure for 1 hour to complete the ester exchange reaction.

Thus obtained polyester (12) had a hydroxyl value of 37 and a number average molecular weight (polystyrene conversion, measured by GPC of column temperature 135° C. and trichlorbenzene solvent) of 4,000.

When the polyester was heated at a rate of 10° C. per minute by using a differential scanning calorimetry, there was a main exothermic peak at about 152° C., and when cooled at rate of 10° C. per minute, a main exothermic peak at about 110° C.

The resin was then examined by using a microscope equipped with a heating stage under crossed nicols and specific texture due to optical anisotropic property was clearly observed.

EXAMPLE 13

Into a reaction vessel, were placed 7 mols of dimethyl ester of 4,4'-diphenyl carboxylic acid, 6 mols of 1,6-hexanediol, 2 mols of triethyleneglycol and 1.5 g of dibutyl tin oxide and the mixture was heated under dried nitrogen gas to get a milt. Ester exchange reaction was carried out at 130°~230° C. while removing the formed methanol out of the system.

After collecting 530 ml of methanol, the content was further reacted at 230° C. under 10 mmHg pressure for 1 hour to complete the ester exchange reaction.

Thus obtained polyester (13) had a hydroxyl value of 40 and a number average molecular weight (polystyrene conversion, measured by GPC of column temperature 135° C. and trichlorbenzene solvent) of 4,250.

When the polyester was heated at a rate of 10° C. per minute by using a differential scanning calorimetry, there was a main endothermic peak at about 155° C., and when cooled at a rate of 10° C. per minute, a main exothermic peak at 80° C.

The resin was then examined by using a microscope equipped with a heating stage under crossed nicols and specific texture due to optical anisotropic property was clearly observed.

EXAMPLE 14.

Into a reaction vessel, were placed 1,000 g of toluene and 100 g of pyridine, and then 0.5 mol of 4,4'-biphenyl carboxylic acid chloride and 0.55 mol of diethyleneglycol and the mixture was heated under dried nitrogen gas to 100° C. and reacted at the same temperature until the absorption peak in 1R at 1780cm (corresponding to said carboxylic acid chloride) had disappear. Thereafter, the reaction mixture was dropwise added to 2,000 ml of methanol and the precipitates were filtered and dried to obtain a polyester resin (14).

Thus obtained polyester had a hydroxyl value of 30 and a number average molecular weight (polystyrene conversion, measured by GPC of column temperature 135° C. and trichlorbenzene solvent) of 4,900.

When the polyester was heated at a rate of 10° C. per minute by using a differential scanning calorimetry, there was a sharp and large endothermic peak at 125° C., and when cooled at a rate of 10° C. per minute, a sharp and large exothermic peak at 48° C.

The resin was then examined by using a microscope equipped with a heating stage under crossed nicols and specific texture due to optical anisotropic property was clearly observed.

EXAMPLE 15

Into a reaction vessel, were placed 7 mols of dimethyl ester of 1,10-decanedicarboxylic acid, 1 mol of 4-hydroxy benzoic acid, 7.5 mols of 4,4-biphenol, 0.5 mol of trimethylol propane and 1.5 g of dibutyl tin oxide and the mixture was heated under dried nitrogen gas to get a melt. Ester exchange reaction was carried out at 130°~250° C. while removing the formed methanol out of the system.

After collecting 500 ml of methanol, the content was further reacted at 250° C. and under 10 mmHg pressure for 1 hour to complete the ester exchange reaction.

The mixture was allowed to cool, while adding at 200° C. and below, 1,000 g of N-methyl pyrolidone. This was then dropwise added to a separate tank containing 5,000 ml of methanol under stirring and the precipitated polymer was filtered and dried.

Thus obtained polyester (15) had a hydroxyl value of 52 and a number average molecular weight (polystyrene conversion, measured by GPC using column temperature 135° C. and trichlorbenzene solvent) of 4,680.

When the polyester was heated at a rate of 10° C. per minute by using a differential scanning calorimetry, there was a sharp and large endothermic peak at about 155° C., and when cooled at a rate of 10° C. per minute, a sharp exothermic peak at about 123° C.

The resin was then examined by using a microscope equipped with a heating stage under crossed nicols and specific texture due to optical anisotropic property was clearly observed.

EXAMPLE 16

Into a reaction vessel, were placed 5 mols of 2,6-naphthalene dicarboxylic acid, 6 mols of 1,9-nonanediol and 2.0 g of dibutyl tin oxide and the mixture was heated under dried nitrogen gas to get a melt.

Ester exchange reaction was carried out at 130°~230° C. while removing the formed methanol out of the system.

After collecting 350 ml of methanol, the content was further reacted at 230° C. and under 10 mmHg pressure for 1 hour to complete the ester exchange reaction.

Thus obtained polyester (16) had a hydroxyl value of 30 and a number average molecular weight (polystyrene conversion, measured by GPC using column temperature 135° C. and trichlorbenzene solvent) of 3,680.

When the polyester was heated at a rate of 10° C. per minute by using a differential scanning calorimetry, there was a sharp and large endothermic peak at about 125° C., and when cooled at a rate of 10° C. per minute, a sharp and large exothermic peak at about 49° C.

The resin was then examined by using a microscope equipped with a heating stage under crossed nicols and specific texture due to optical anisotropic property was clearly observed.

EXAMPLE 17

Into a reaction vessel, were placed 640 parts of dimethyl ester of 4,4'-diphenyl carboylic acid, 397 parts of 1,9-nonanediol, 29 parts of trimethylol propane and 0.5 g of dibutyl tin oxide and the mixture was heated under dried nitrogen gas to get a melt.

Ester exchange reaction was carried out at 130°~230° C. while removing the formed methanol out of the system.

After collecting 175 ml of methanol, the content was further reacted at 230° C. and under 10 mmHg pressure for 1 hour to complete the ester exchange reaction.

Thus obtained polyester (17) had a hydroxyl value of 50 and a number average molecular weight (polystyrene conversion, measured by GPC using column temperature 135° C. and trichlorbenzene solvent) of 4,500.

When the polyester was heated at a rate of 10° C. per minute by using a differential scanning calorimetry, there was a sharp and large endothermic peak at about 138° C., and when cooled at a rate of 10° C. per minute, a sharp and large exothermic peak at about 110° C.

The resin was then examined by using a microscope equipped with a heating stage under crossed nicols and specific texture due to optical anisotropic property was clearly observed.

Thus obtained, thermosetting polyester resin and CRELAN UI ($\epsilon$-caprolactam blocked IPDI, NCO equivalent 365, trademark of Bayer) were combined together in a OH/NCO equivalent ratio of 1/1 and the mixture was added with dibutyl tin dilaurate in an amount corresponding to 1.0 wt % of the total weight of the combined mixture. This was then heat-melted at about 130° C., allowed to cool and pulverized to powder having an average diameter of 10$\mu$ or less. Thus obtained powder was applied onto a tin plate and baked at 180° C. for 20 minutes to obtain a coating, which was clear and smoothness.

The results were shown in Table 2.

EXAMPLE 18

100 parts of the polyester (17) obtained in Example 17 were placed in a reaction vessel and heated under dried nitrogen gas to 170° C. to get a melt.

To this, were added 18.7 parts of trimellitic anhydride and the mixture was reacted at 170° C. for 30 minutes to obtain a polyester (18).

Thus obtained polyester had a hydroxyl value of 1.0, an acid value of 85, and a number average molecular weight (polystyrene conversion, measured by GPC of column temperature 135° C. and trichlorbenzene solvent) of 5,800.

When the polyester was heated at a rate of 10° C. per minute by using a differential scanning calorimetry, there was a large endothermic peak at about 130° C., and when cooled at a rate of 10° C. per minute, a large exothermic peak at about 88° C.

The resin was then examined by using a microscope equipped with a heating stage under crossed nicols and specific texture due to optical anisotropic property was observed (not so clear).

Thus obtained polyester resin was then combined with EPOTOHTO YD-011 (epoxy resin, epoxy equivalent 475, trademark of Tohto Kasei) in a COOH/epoxy equivalent ratio of 1/1 and after melting at about 120° C., cooling and then pulverizing, powder with an average diameter of 10$\mu$ or less was obtained. This powder was then applied onto a tin plate and baked at 230° C. for 20 minutes. Thus formed coating was evaluated as in Example 17 and the test results were shown in Table 2.

EXAMPLE 19

100 parts of the polyester (17) obtained in Example 17 were placed in a reaction vessel and heated under dried nitrogen gas to 150° C.

To this, were added 14.4 parts of phthalic anhydride and the mixture was reacted at 150° C. for 30 minutes to obtain a polyester (19).

Thus obtained polyester had a hydroxyl value of 1.0, an acid value of 45, and a number average molecular weight (polystyrene conversion, measured by GPC using column temperature 135° C. and trichlorbenzene solvent) of 4,740.

When the polyester was heated at a rate of 10° C. per minute by using a differential scanning calorimetry, there was a sharp and large endothermic peak at about 135° C., and when cooled at a rate of 10° C. per minute, a large exothermic peak at about 113° C.

The resin was then examined by using a microscope equipped with a heating stage under crossed nicols and specific texture due to optical anisotropic property was observed (not so clear).

Thus obtained polyester resin was then combined with EPOTOHTO YD-011 (epoxy resin, epoxy equivalent 475, trademark of Tohto Kasei) in a COOH/epoxy equivalent ratio of 1/1 and after melting at about 120° C., cooling and then pulverizing, powder with an average diameter of 10,$\mu$ or less was obtained. This powder was then applied onto a tin plate and baked at 180° C. for 20 minutes.

Thus formed coating was evaluated as in Example 17 and the test results were shown in Table 2.

EXAMPLE 20~26

Using the materials shown in Table 3, the same procedures as stated in Example 17 were repeated to obtain polyester resins (20~26).

Hydroxyl values, acid values, number average molecular weights, thermal properties tested by differential scanning calorimetry and microscopic observation results for these resins are shown in Table 4.

Thermosetting properties of these polyester resins were tested as in Example 17 and the results were shown in Table 2.

EXAMPLE 27

Into a reaction vessel, were placed 554 parts of dimethyl ester of sebacic acid, 487 parts of 4,4-biphenol, 17.9 parts of trimethylol propane and 0.5 g of dibutyl tin oxide and the mixture was heated under dried nitrogen gas to get a melt.

Ester exchange reaction was carried out at 130°~250° C. while removing the formed methanol out of the system.

After collecting 186 ml of methanol, the content was further reacted at 250° C. under 10 mmHg pressure for 2 hours to complete the ester exchange reaction.

The mixture was allowed to cool, while adding at 200° C. and below, 1,000 parts of N-methyl pyrolidone. 118 parts of phthalic anhydride were added at 150° C. and reacted. This was then dropwise added to a separate tank containing 5,000 ml of toluene under stirring and the precipitated polymer was filtered and dried.

Thus obtained polyester (27) had a hydroxyl value of 1.0, an acid value of 45 a number average molecular weight (polystyrene conversion, measured by GPC using column temperature 135° C. and trichlorbenzene solvent) of 3,920.

When the polyester was heated at a rate of 10° C. per minute by using a differential scanning calorimetry, there was a sharp and large endothermic peak at about 205° C., and when cooled at a rate of 10° C. per minute, a sharp exothermic peak at about 177° C.

The resin was then examined by using a microscope equipped with a heating stage under crossed nicols and specific texture due to optical anisotropic property was clearly observed.

The thermosetting properties of thus obtained resin were evaluated as in Example 18 and the test results were shown in Table 2.

COMPARATIVE EXAMPLE 4

Using the thermosetting polyester resin (A) obtained in Comparative Example 1 and CRELAN Ul, the similar cured coating as stated in Example 17 was prepared. Thus obtained coaing was turbid and brittle and there were many fine particles in the coating.

This indicates that the said polyester resin is unsuitable as a thermosetting resin for coating use. The test results are shown in Table 2.

COMPARATIVE EXAMPLE 5

Using the materials shown in Table 3 and repeating the procedures as stated in Example 17, comparative polyester (D) was prepared.

Thus obtained polyester had a hydroxyl value of 45 and a number average molecular weight (polystyrene conversion, measured by GPC of column temperature 135° C. and trichlorbenzene solvent) of 5,100.

When the polyester was heated at a rate of 10° C. per minute by using a differential scanning calorimetry, and then cooled at a rate of 10° C. per minute, no definite endothermic peak and exothermic peak were observed.

The resin was then examined by using a microscope equipped with a heating stage under crossed nicols, and however, no particular texture due to optical anisotropic property was observed.

Thus obtained resin was an amorphous polyester and did not have a clear phase transition point.

COMPARATIVE EXAMPLE 6

100 parts of the polyester (21) obtained in Example 21 were placed in a reaction vessel and heat-melted at 150° C. under dried nitrogen gas stream.

To this, 26.4 parts of trimellitic anhydride were added and reacted at the same temperature for 1 hour to obtain a polyester resin (E).

Thus obtained polyester had a hydroxyl value of 3.0, an acid value of 75, and a number average molecular weight (polystyrene conversion, measured by GPC using column temperature 135° C. and trichlorbenzene solvent) of 3,100. When the polyester was heated at a rate of 10° C. per minute by using a differential scanning calorimetry, and then cooled at a rate of 10° C. per minute, no definite endothermic peak and exothermic peak were observed.

The resin was then examined by using a microscope equipped with a heating stage under crossed nicols, and however, no particular texture due to optical anisotropic property was observed.

Thus obtained resin was an amorphous polyester and did not have a clear phase transition point.

TABLE 2

|  | Example | | | | | | | |
|---|---|---|---|---|---|---|---|---|
|  | 17 | 18 | 19 | 20 | 21 | 22 | 23 | 24 |
| Cured coating | clear | clear | clear | clear | clear | clear | clear | clear |
| flatness of film* | ○ | ○ | ○ | ○ | Δ | Δ | ○ | ○ |

|  | Example | | | Comp. Exam. |
|---|---|---|---|---|
|  | 25 | 26 | 27 | 4 |
| Cured coating | clear | clear | slightly turbid | turbid no continuous film |
| flatness of film* | ○ | ○ | Δ | X |

TABLE 3

|  | Example |  |  |  |  |  |  |  |  |  |  | Comp. Exam. |  |  |
|---|---|---|---|---|---|---|---|---|---|---|---|---|---|---|
|  | 17 | 18 | 19 | 20 | 21 | 22 | 23 | 24 | 25 | 26 | 27 | 4 | 5 | 6 |
| A | | | | | | | | | | | | | | |
| DPCDM (*1) | 640 | 70.0 | 70.7 | 653 | 611 | 720 | 660 | 587 | 416 | 565 | | 540 | 128 | 66.4 |
| dimethyl terephthalate | | | | | | | | | 199 | | | | 368 | |
| dimethyl isophthalate | | | | | | | | 46.9 | | | | | | |
| NDCCL (*2) | | | | | | | | | | | | | | |
| CHCDM (*3) | | | | | | | | | | 58.0 | | | | |
| SBADM (*4) | | | | | | | | | | | 554 | | | |
| B | | | | | | | | | | | | | | |
| 1,9-nonanediol | 397 | 43.4 | 43.4 | 385 | 396 | | | 405 | 428 | 390 | | 248 | 390 | 43.1 |
| 1,6-hexanediol | | | | | | 325 | | | | | | | | |
| triethyleneglycol | | | | | | | 380 | | | | | | | |
| tetraethyleneglycol | | | | | | | | | | | | | | |
| 4,4'-biphenol | | | | | | | | | | | 487 | | | |
| R | | | | | | | | | | | | | | |
| trimethylol propane | 29.0 | 3.17 | 3.17 | 28.9 | 57.0 | 28.7 | | 29 | 28.8 | 28.5 | 17.9 | | 28.8 | 6.2 |
| pentol | | | | | | | 15.3 | | | | | | | |
| phthalic anhydride | | 14.4 | | | | | | | | | | | | 26.4 |
| trimellitic anhydride | | 18.7 | | | | | | | | | | | | |

*1 ... dimethylester of 4,4'-diphenylcarboxylic acid
*2 ... 2,6-naphthalene dicarboxylic acid chloride
*3 ... dimethylester of trans-1,4-cyclohexane dicarboxylic acid
*4 ... dimethylester of sebacic acid

TABLE 4

|  | Example |  |  |  |  |  |  |
|---|---|---|---|---|---|---|---|
|  | 17 | 18 | 19 | 20 | 21 | 22 | 23 |
| OH value | 50 | 1 | 1 | 35 | 100 | 50 | 45 |
| Acid value | | 85 | 45 | | | | |
| number average molecular weight (GPC) | 4500 | 5800 | 4740 | 7800 | 2600 | 4500 | 4000 |
| DSC | | | | | | | |
| endothermic peak temp. (°C.) | 138 | 130 | 135 | 138 | 135 | 208 | 183 |
| exothermic peak temp. (°C.) | 110 | 88 | 113 | 116 | 100 | 175 | 166 |
| anisotropic property | yes | yes | yes | yes | yes | yes | yes |

|  | Example |  |  |  | Comp. Exam. |  |  |
|---|---|---|---|---|---|---|---|
|  | 24 | 25 | 26 | 27 | 4 | 5 | 6 |
| OH value | 45 | 45 | 45 | 1 | 5 | 45 | 3 |
| Acid value | | | | 45 | | | 75 |
| number average molecular weight (GPC) | 4300 | 4530 | 4800 | 3920 | 28000 | 5100 | 3100 |
| DSC | | | | | | | |
| endothermic peak temp. (°C.) | 125 | 90 | 135 | 205 | 215 | no | no |
| exothermic peak temp. (°C.) | 80 | 61 | 100 | 177 | 180 | no | no |
| anisotropic property | yes | yes | yes | yes | yes | no | no |

EXAMPLE 28

Into a reaction vessel, were placed 8 mols of 2,6-naphthalene dicarboxylic acid, 8.44 mols of 1,9-nonanediol, 0.46 mol of trimethylol propane and 1.5 g of dibutyl tin oxide and the mixture was heated under dried nitrogen gas to obtain a melt. Thereafter, the mixture was reacted at 130°~230° C., while removing the formed water out of the system. After collecting 280 ml of water, the mixture was further reacted at 230° C. under 10 mmHg pressure for 1 hour to complete the esterification reaction and obtain a polyester resin (28).

Thus obtained polyester had a hydroxyl value of 42 and a number average molecular weight (polystyrene conversion, measured by GPC using column temperature 135° C. and trichlorbenzene solvent) of 5,680.

When the polyester was heated at a rate of 10° C. per minute by using a differential scanning calorimetry, there was a sharp and large endothermic peak at about 124° C., and when cooled at a rate of 10° C. per minute, a sharp exothermic peak at about 43° C.

The resin was then examined by using a microscope equipped with a heating stage under crossed nicols and specific texture due to optical anisotropic property was clearly observed.

EXAMPLE 29

Into a reaction vessel, were placed 7 mols of dimethyl ester of 4,4'-diphenyl carboxylic acid, 8.44 mols of 1,9-nonanediol, 0.46 mol of trimethylol propane, 1 mol of dimethylester of trans-1,4-cyclohexane dicarboxylic acid and 1.5 g of dibutyl tin oxide and the mixture was heated under dried nitrogen gas to get a melt. Thereafter, the mixture was reacted at 130°~230° C., while removing the formed methanol out of the system.

After collecting 610 ml of the formed methanol, the mixture was further reacted at 230° C. under 10 mmHg pressure for 1 hour to complete the ester exchange reaction and obtain a polyester resin (9).

Thus obtained polyester had a hydroxyl value of 45 and a number average molecular weight (polystyrene conversion, measured by GPC using column temperature 135° C. and trichlorbenzene solvent) of 4,500.

When the polyester was heated at a rate of 10° C. per minute by using a differential scanning calorimetry, there was an endothermic peak at about 113° C., and when cooled at a rate of 10° C. per minute, an exothermic peak at about 68° C.

The resin was then examined by using a microscope equipped with a heating stage under crossed nicols and specific texture due to optical anisotropic property was clearly observed.

EXAMPLE 30

Into a reaction vessel, were placed 1.0 mol of dimethyl ester of 4,4'-diphenyl carboxylic acid, 1.0 mol of 1,9-nonanediol, 0.1 mol of trimethylol propane and 0.5 g of dibutyl tin oxide and the mixture was heated under dried nitrogen gas to get a melt. Temperature was gradually raised to 230° C., while removing methanol which was formed by an ester exchange reaction out of the system and the mixture was reacted at 230° C. for 2 hours. 75 ml of methanol were collected.

Thereafter, the mixture was further reacted at 230° C. and under 10 mmHg pressure for 1 hour to complete the ester exchange reaction and obtain a polyester resin (P).

Next, 0.2 mol of trimellitic anhydride was added to the reaction mixture maintained at 180° C. and the combined mixture was reacted at the same temperature for 90 minutes to obtain a polyester resin (30).

Thus obtained polyester had a hydroxyl value of 14, and acid value of 54 and a number average molecular weight (polystyrene conversion, measured by GPC using column temperature 135° C. and trichlorbenzene solvent) of 5,200.

When the polyester was heated at a rate of 10° C. per minute by using a differential scanning calorimetry, there was a large endothermic peak at about 130° C., and when cooled at a rate of 10° C. per minute, a large exothermic peak at about 88° C.

The resin was then examined by using a microscope equipped with a heating stage under crossed nicols and specific texture due to optical anisotropic property was clearly observed.

EXAMPLE 31

To the polyester (P) obtained in Example 30 and maintained under dried nitrogen gas at 150° C. and in molten state, 0.3 mol of phthalic anhydride was added and the combined mixture was reacted at 150° C. for 60 minutes to obtain a polyester resin (31).

Thus obtained polyester had an acid value of 40 and a number average molecular weight (polystyrene conversion, measured by GPC using column temperature 135° C. and trichlorbenzene solvent) of 4,740.

When the polyester was heated at a rate of 10° C. per minute by using a differential scanning calorimetry, there was a sharp and large endothermic peak at about 135° C., and when cooled at a rate of 10° C. per minute, a sharp and large exothermic peak at about 113° C.

The resin was then examined by using a microscope equipped with a heating stage under crossed nicols and specific texture due to optical anisotropic property was clearly observed.

EXAMPLE 32

Into a reaction vessel, were placed 1.0 mol of 2,6-naphthalene dicarboxylic acid, 1.0 mol of 1,9-nonanediol, 0.1 mol of trimethylol propane and 0.5 g of dibutyl tin oxide and the mixture was heated under dried nitrogen gas to obtain a melt. Thereafter, the temperature was gradually raised to 220° C., while removing the formed water out of the system and the mixture was reacted at 220° C. for 3 hours. After collecting 34 ml of water, the mixture was further reacted at 220° C. under 10 mmHg pressure for 1 hour to complete the esterification reaction.

Then, at 180° C., 0.25 mol of trimellitic anhydride were added under dried nitrogen gas and the combined was reacted for 90 minutes to obtain a polyester resin (32).

Thus obtained polyester had a hydroxyl value of 6, an acid value of 68 and a number average molecular weight (polystyrene conversion, measured by GPC using column temperature 135° C. and trichlorbenzene solvent) of 5,400.

When the polyester was heated at a rate of 10° C. per minute by using a differential scanning calorimetry, there was a large endothermic peak at about 112° C., and when cooled at a rate of 10° C. per minute, a large exothermic peak at about 68° C.

The resin was then examined by using a microscope equipped with a heating stage under crossed nicols and specific texture due to optical anisotropic property was observed (slightly uncleared).

EXAMPLE 33

Into a reaction vessel, were placed 1.0 mol of dimethyl ester of 4,4'-diphenyl carboxylic acid, 1.0 mol of 1,9-nonanediol, 0.2 mol of trimethylol propane and 0.5 g of dibutyl tin oxide and the mixture was heated under dried nitrogen gas to get a melt.

While removing the formed methanol out of the system, the mixture was gradually heated to 230° C. and reacted at the same temperature for 2 hours. Total 72 ml of methanol were collected. Then, the mixture was further reacted at 230° C. and under 10 mmHg pressure for 1 hour to complete ester exchange reaction, allowed to cool to 180° C., added under dried nitrogen gas 0.4 mol of trimellitic anhydride and the combined mixture was reacted for 90 minutes to obtain a polyester resin (33).

When the polyester was heated at a rate of 10° C. per minute by using a differential scanning calorimetry, there was a large endothermic peak at about 130° C., and when cooled at a rate of 10° C. per minute, a large exothermic peak at about 58° C.

The resin was then examined by using a microscope equipped with a heating stage under crossed nicols and specific texture due to optical anisotropic property was clearly observed.

EXAMPLE 34

Into a reaction vessel, were placed 0.6 mol of dimethyl ester of 4,4'-diphenyl carboxylic acid, 0.4 mol of dimethylester of terephthalic acid, 1.0 mol of 1,9-nonanediol, 0.1 mol of trimethylol propane and 0.5 g of dibutyl tin oxide and the mixture was heated under dried nitrogen gas to get a melt.

While removing the formed methanol out of the system, the mixture was gradually heated to 230° C. and reacted at the same temperature for 2 hours. Total 73 ml of methanol were collected. Then, the mixture was further reacted at 230° C. and under 10 mmHg pressure for 1 hour to complete ester exchange reaction, allowed to cool to 170° C., added under dried nitrogen gas 0.3 mol of phthalic anhydride and the combined mixture was reacted for 60 minutes to obtain a polyester resin (34).

Thus obtained polyester had an acid value of 44 and a number average molecular weight (polystyrene conversion, measured by GPC using column temperature 135° C. and trichlorbenzene solvent) of 4,230.

When the polyester was heated at a rate of 10° C. per minute by using a differential scanning calorimetry, there was an endothermic peak at about 118° C. and when cooled at a rate of 10° C. per minute, an exothermic peak at about 65° C.

The resin was then examined by using a microscope equipped with a heating stage under crossed nicols and specific texture due to optical anisotropic property was clearly observed.

EXAMPLE 35

Into a reaction vessel, were placed 0.8 mol of dimethyl ester of 4,4'-diphenyl carboxylic acid, 0.2 mol of dimethyl ester of trans-1,4-cyclohexane carboxylic acid, 1.0 mol of 1,6-hexanediol, 0.1 mol of trimethylol propane and 0.5 g of dibutyl tin oxide and the mixture was heated under dried nitrogen gas to get a melt.

While removing the formed methanol out of the system, the mixture was gradually heated to 240° C. and reacted at the same temperature for 4 hours. Total 70 ml of methanol were collected. Then, the mixture was further reacted at 240° C. and under 10 mmHg pressure for 1 hour to complete ester exchange reaction, allowed to cool to 150° C., added under dried nitrogen gas 0.25 mol of phthalic anhydride and the combined mixture was reacted for 60 minutes to obtain a polyester resin (35).

Thus obtained polyester had a hydroxyl value of 7, an acid value of 34 and a number average molecular weight (polystyrene conversion, measured by GPC using column temperature 135° C. and trichlorbenzene solvent) of 4,000.

When the polyester was heated at a rate of 10° C. per minute by using a differential scanning calorimetry, there was a large endothermic peak at about 145° C. and when cooled at a rate of 10° C. per minute, a large exothermic peak at about 53° C.

The resin was then examined by using a microscope equipped with a heating stage under crossed nicols and specific texture due to optical anisotropic property was clearly observed.

EXAMPLE 36

Into a reaction vessel, were placed 1.0 mol of dimethyl ester of 4,4'-diphenyl carboxylic acid, 1.0 mol of 1,9-nonanediol, 0.1 mol of trimethylol propane and 0.5 g of dibutyl tin oxide and the mixture was heated under dried nitrogen gas to get a melt.

While removing the formed methanol out of the system, the mixture was gradually heated to 230° C. and reacted at the same temperature for 2 hours. Total 72 ml of methanol were collected. Then, the mixture was further reacted at 230° C. and under 10 mmHg pressure for 1 hour to complete ester exchange reaction, allowed to cool to 180° C., added under dried nitrogen gas 0.3 mol of tetrachlorophthalic anhydride and the combined mixture was reacted for 2 hours to obtain a polyester resin (36).

Thus obtained polyester had an acid value of 37 and a number average molecular weight (polystyrene conversion, measured by GPC using column temperature 135° C. and trichlorbenzene solvent) of 5,690.

When the polyester was heated at a rate of 10° C. per minute by using a differential scanning calorimetry, there was an endothermic peak at about 133° C. and when cooled at a rate of 10° C. per minute, an exothermic peak at about 67° C.

The resin was then examined by using a microscope equipped with a heating stage under crossed nicols and specific texture due to optical anisotropic property was clearly observed.

SYNTHETIC EXAMPLES 1~4 (FOR COMPARISON)

Using the materials shown in Table 5 and adding 0.1 part of dibutyl tin oxide as a catalyst, esterification was carried out at 240°~250° C.

After collecting theoretical amounts of formed water, the reaction mixtureO was further reacted under 16~20 mmHg pressure for about 5 hours. By this means, polyester resins F~I were prepared. The characteristics of these resins are shown in Table 6.

SYNTHETIC EXAMPLE 5 (FOR COMPARISON)

Using the materials shown in Table 5 and adding 0.1 part of dibutyl tin oxide as a catalyst, ester exchange reaction was carried out at 220°~230° C.

After collecting theoretical amounts of formed methanol, the reaction mixture was further reacted at 240°~250° C. and under reduced pressure of 16~20 mmHg for about 5 hours to obtain a polyester resin (J).

The characteristics of the resin are shown in Table 6.

TABLE 5

| | Comparative Example | | | | |
|---|---|---|---|---|---|
| | 7 | 8 | 9 | 10 | 11 |
| terephthalic acid | 166 | 133 | 166 | 166 | |
| dimethyl terephthalate | | | | | 78 |
| isophthalic acid | | 33 | | | |
| dimethyl isophthalate | | | | | 78 |
| adipic acid | | | | | 29 |
| 1,6-hexanediol | 106 | 95 | 136 | 71 | 71 |
| 1,4-butanediol | 45 | 63 | 27 | 72 | 27 |
| ethylene glycol | | | | | 40 |
| neopenthyl glycol | 10 | | | | |
| trimethylol propane | | | | 4 | | numerical figure is given by weight.

TABLE 6

| Polyester resin | F | G | H | I | J |
|---|---|---|---|---|---|
| OH value | 13 | 36 | 26 | 50 | 28 |
| number average molecular weight (GPC) | 7200 | 2800 | 3800 | 2300 | 3700 |
| DSC | | | | | |
| endothermic peak | no | no | no | no | no |
| temperature (°C.) | peak | peak | peak | peak | peak |
| exothermic peak | no | no | no | no | no |
| temperature (°C.) | peak | peak | peak | peak | peak |
| anisotropic property | no | no | no | no | no |

SYNTHETIC EXAMPLE 6 (FOR COMPARISON)

Into a reaction vessel, were placed 83 parts of ethyleneglycol, 327 parts of neopentyl glycol, 435 parts of dimethyl terephthalate and 0.4 part of zinc acetate and the mixture was heated under dried nitrogen gas to get a melt.

While removing the formed methanol out of the system, the temperature was gradually raised to 210° C. and the mixture was reacted at the same temperature for 2 hours. Then, 6 parts of trimethylol propane, 149 parts of terephthalic acid, 224 parts of isophthalic acid and 0.5 part of dibutyl tin oxide were added and the combined mixture was heated to 240° C. in 8 hours, reacted at the same temperature until the resinous acid value reached 7, allowed to cool to 180° C, added under dried nitrogen gas with 29 parts of trimellitic anhydride and further reacted for 90 minutes to obtain a polyester resin (K).

Thus obtained polyester had a hydroxyl value of 5, an acid value of 23, and a number average molecular weight (polystyrene conversion, measured by GPC of column temperature 135° C. and trichlorbenzene solvent) of 6,590.

However, this polyester was an amorphous, clear resin and showed no endothermic peak in a differential scanning calorimetric analysis.

The resin was also examined by using a microscope equipped with a heating stage under crossed nicols, and however, the characteristic texture due to optical anisotropic property was not observed.

SYNTHETIC EXAMPLE 7 (FOR COMPARISON)

Into a reaction vessel, were placed 136 parts of ethyleneglycol, 253 parts of neopentyl glycol, 472 parts of dimethyl terephthalate, 29 parts of 1,6-hexanediol and 0.4 part of zinc acetate and the mixture was heated under dried nitrogen gas to get a melt.

While removing the formed methanol out of the system, the temperature was gradually raised to 210° C. and the mixture was reacted at the same temperature for 2 hours. Then, 20 parts of trimethylol propane, 308 parts of terephthalic acid, 224 parts of isophthalic acid and 0.5 part of dibutyl tin oxide were added and the combined mixture was heated to 240° C. in 8 hours, reacted at the same temperature until the resinous acid value reached 6, allowed to cool to 200° C., added under dried nitrogen gas with 120 parts of trimellitic anhydride and further reacted for 90 minutes to obtain a polyester resin (L).

Thus obtained polyester had an acid value of 50, and a number average molecular weight (polystyrene conversion, measured by GPC of column temperature 135° C. and trichlorbenzene solvent) of 5,700.

However, this polyester was an amorphous, clear resin and showed no endothermio peak in a differential scanning calorimetric analysis.

The resin was also examined by using a microscope equipped with a heating stage under crossed nicols, and however, the characteristic texture due to optical anisotropic property was not observed.

EXAMPLE 37~49

In each of the examples, the materials shown in Table 7 were pre-mixed in the indicated amounts and the pre-mix was melt-kneaded by using PR-46 type co-kneader (Bus Corp.) at the indicated temperature. After cooling, the solidifed mass was pulverized and shieved by using 150 mesh net to obtain a powder coating having an average diameter of 150 mesh or less.

Thus obtained powder was applied onto a soft steel plate by using an electrostatic powder coating equipment, and the coated plate was baked at 230° C. for 5 minutes to obtain a coating.

Storage stability of such powder coating and film properties of thus obtained coating were evaluated and the test results were shown in Table 8.

COMPARATIVE EXAMPLE 7~11

The same procedures as stated in Examples 37~49 were repeated using the materials shown in Table 7 as well as resin F, G, H, I or J.

The storage stability of the respective coating powder and film properties are shown in Table 8.

TABLE 7

| | Example | | | | |
|---|---|---|---|---|---|
| | 37 | 38 | 39 | 40 | 41 |
| polyester resin | (1) | (3) | (12) | (13) | (7) |
| amounts | 89 | 71 | 84 | 83 | 88 |
| hardener CRELAN UI KL-2525 | 11 | 29 | 16 | 17 | 12 |
| levelling agent Ac4F | 1 | 1 | 1 | 1 | 1 |
| curing catalyst DBTL | 0.3 | 0.3 | 0.3 | 0.3 | 0.3 |
| titanium oxide JR-600 | 50 | 50 | 50 | 50 | 50 |
| kneading temperature (°C.) | 150 | 140 | 160 | 160 | 130 |

| | Example | | | | |
|---|---|---|---|---|---|
| | 42 | 43 | 44 | 45 | 46 |
| polyester resin | (8) | (14) | (10) | (15) | (16) |
| amounts | 88 | 87 | 88 | 75 | 87 |
| hardener CRELAN UI | | | | 25 | |
| KL-2525 | 12 | 13 | 12 | | 13 |
| levelling agent Ac4F | 1 | 1 | 1. | 1 | 1 |
| curing catalyst DBTL | 0.3 | 0.3 | 0.3 | 0.3 | 0.3 |
| titanium oxide JR-600 | 50 | 50 | 50 | 50 | 50 |
| kneading temperature (°C.) | 110 | 130 | 100 | 160 | 130 |

| | Example | | |
|---|---|---|---|
| | 47 | 48 | 49 |
| polyester resin | (28) | (17) | (29) |
| amounts | 79 | 77 | 77 |
| hardener CRELAN UI KL-2525 | 21 | 23 | 23 |
| levelling agent Ac4F | 1 | 1 | 1 |
| curing catalyst DBTL | 0.3 | 0.3 | 0.3 |
| titanium oxide JR-600 | 50 | 50 | 50 |
| kneading temperature (°C.) | 130 | 140 | 120 |

| | Comparative Example | | | | |
|---|---|---|---|---|---|
| | 7 | 8 | 9 | 10 | 11 |
| polyester resin | F | G | H | I | J |
| amounts | 92 | 85 | 84 | 74 | 88 |
| hardener CRELAN UI KL-2525 | 8 | 15 | 16 | 26 | 12 |
| levelling agent Ac4F | 1 | 1 | 1 | 1 | 1 |
| curing catalyst DBTL | 0.3 | 0.3 | 0.3 | 0.3 | 0.3 |
| titanium oxide | 50 | 50 | 50 | 50 | 50 |

TABLE 7-continued

| | | | | | |
|---|---|---|---|---|---|
| JR-600 kneading temperature (°C.) | 130 | 110 | 150 | 110 | 70 |

TABLE 8

| | Example | | | | |
|---|---|---|---|---|---|
| | 37 | 38 | 39 | 40 | 41 |
| flatness | ⊚ | ⊚ | ○ | ○ | ⊚ |
| 60° specular reflectance (%) | 95 | 92 | 92 | 89 | 91 |
| Erichsen (mm) | >9 | >9 | >9 | >9 | >9 |
| impact strength (kg · cm) | >50 | >50 | 40 | 40 | >50 |
| bending property | ⊚ | ○ | ⊚ | ⊚ | ○ |
| blocking resistance | ⊚ | ⊚ | ⊚ | ⊚ | ⊚ |

| | Example | | | | |
|---|---|---|---|---|---|
| | 42 | 43 | 44 | 45 | 46 |
| flatness | ⊚ | ⊚ | ⊚ | ○ | ⊚ |
| 60° specular reflectance (%) | 94 | 93 | 92 | 92 | 93 |
| Erichsen (mm) | >9 | >9 | >9 | >9 | >9 |
| impact strength (kg · cm) | >50 | >50 | >50 | 40 | >50 |
| bending property | ○ | ⊚ | ⊚ | ○ | ⊚ |
| blocking resistance | ⊚ | ⊚ | ⊚ | ⊚ | ⊚ |

| | Example | | |
|---|---|---|---|
| | 47 | 48 | 49 |
| flatness | ⊚ | ⊚ | ⊚ |
| 60° specular reflectance (%) | 91 | 92 | 91 |
| Erichsen (mm) | >9 | >9 | >9 |
| impact strength (kg · cm) | >50 | >50 | >50 |
| bending property | ⊚ | ⊚ | ⊚ |
| blocking resistance | ⊚ | ⊚ | ⊚ |

| | Comparative Example | | | | |
|---|---|---|---|---|---|
| | 7 | 8 | 9 | 10 | 11 |
| flatness | X | ⊚ | ○ | ⊚ | ○ |
| 60° specular reflectance (%) | 81 | 92 | 88 | 90 | 87 |
| Erichsen (mm) | >9 | 7 | >9 | >9 | 5 |
| impact strength (kg · cm) | >50 | 40 | >50 | >50 | 30 |
| bending property | ⊚ | X | ○ | ○ | X |
| blocking resistance | ○ | X | Δ | X | X |

EXAMPLES 50~57 AND COMPARATIVE EXAMPLES 12~14

Using the materials shown in Table 9 and following the procedured given in Examples 37 49, various powder coatings were prepared.

Each powder was then applied onto a zinc phosphate treated steel plate (0.8 mm thickness) by using an electrostatic powder coating equipment so as to give a dry film thickness of 50~60 μm and the coated plate was baked at 200° C. for 20 minutes.

These powder coatings and film properties were evaluated and the test results were shown in Table 10.

TABLE 9

| | Example | | | | |
|---|---|---|---|---|---|
| | 50 | 51 | 52 | 53 | 54 |
| Polyester resin amounts | (32) 30 | (33) 31 | (34) 32 | (35) 33 | (36) 34 |
| hardener | | | | | |
| EPICOAT 1002 *1 | | | | | |
| EPICOAT 1001 *2 | | 25 | | | 27 |
| EPICOAT 828 *3 | | | | | |
| TGIC *4 | 10 | | 12 | 16 | |
| levelling agent Acronal *5 | 0.5 | 0.5 | 0.5 | 0.5 | 0.5 |
| Titanium dioxide | 40 | 40 | 40 | 40 | 40 |

| | Example | | |
|---|---|---|---|
| | 55 | 56 | 57 |
| Polyester resin amounts | (37) 35 | (17) 90 | (38) 36 |
| hardener | | | |
| EPICOAT 1002 *1 | 28 | | |
| EPICOAT 1001 *2 | | | |
| EPICOAT 828 *3 | | | 11 |
| TGIC *4 | | 10 | |
| levelling agent Acronal *5 | 0.5 | 0.5 | 0.5 |
| Titanium dioxide | 40 | 40 | 40 |

| | Comparative Example | | |
|---|---|---|---|
| | 12 | 13 | 14 |
| Polyester resin amounts | K 79 | L 71 | L 91 |
| hardener | | | |
| EPICOAT 1002 *1 | 21 | | |
| EPICOAT 1001 *2 | | 29 | |
| EPICOAT 828 *3 | | | |
| TGIC *4 | | | 9 |
| levelling agent Acronal *5 | 0.5 | 0.5 | 0.5 |
| Titanium dioxide | 40 | 40 | 40 |

TABLE 10

| | Example | | | | |
|---|---|---|---|---|---|
| | 50 | 51 | 52 | 53 | 54 |
| flatness | ⊚ | ⊚ | ⊚ | ○ | ⊚ |
| 60° specular reflectance (%) | 96 | 95 | 94 | 93 | 96 |
| Erichsen (mm) | >9 | >9 | >9 | >9 | >9 |
| impact strength (kg · cm) | >50 | >50 | >50 | >50 | >50 |
| bending property | ⊚ | ⊚ | ⊚ | ⊚ | ○ |
| blocking resistance | ⊚ | ⊚ | ○ | ○ | ⊚ |

| | Example | | |
|---|---|---|---|
| | 55 | 56 | 57 |
| flatness | ⊚ | ⊚ | ○ |
| 60° specular reflectance (%) | 98 | 93 | 92 |
| Erichsen (mm) | >9 | >9 | >9 |
| impact strength (kg · cm) | >50 | >50 | >50 |
| bending property | ⊚ | ⊚ | ⊚ |
| blocking resistance | ⊚ | ⊚ | ⊚ |

| | Comparative Example | | |
|---|---|---|---|
| | 12 | 13 | 14 |
| flatness | ○ | ○ | X |
| 60° specular reflectance (%) | 85 | 85 | 75 |
| Erichsen (mm) | >7 | >7 | >7 |
| impact strength (kg · cm) | 20 | 30 | 10 |
| bending property | ○ | X | X |
| blocking resistance | ○ | Δ | X |

Since the present polyester resins have the characteristic liquid crystalline properties, when they are used as binder resins for powder coatings thus obtained powder coatings are excellent in storage stabilities and can give excellent coatings.

Therefore, such powders are very useful as precoat metal powder coatings.

What is claimed is:

1. A thermosetting polyester resin comprising a repeating units of the formula: A-X-B, wherein 100 to 50 mol % of A stands for a mesogenic group selected from a polyphenylene group in which 2 or more benzene rings are aligned and connected to each other in their respective para-positions, a polyphenylene group in which 2 or more benzene rings are aligned and connected to each other in their respective para-positions through an azo, azoxy, azomethine, ester or trans-vinylene bond, or a 2,6-naphthylene group, the remaining 50 mol % of A stands from a member selected from the group consisting of p-phenylene, m-phenylene, o-phenylene and tans 1,4-cyclohexylene; B is a spacer group represented by the formula: —(CH$_2$)$_n$— or —(CH$_2$CH$_2$O)$_{\overline{m}}$CH$_2$CH$_2$—, in which n is an integer of 2 to 20 and m is an integer of 1 to 19; and X is an ester bond, the adjoining two repeating units being connected through an ester bond, the end bondings of the connected repeating units being occupied by OH, COOH or their reactive derivatives, the sum of resinous acid value and OH value being 10~200, and being capable of forming an anisotropic molten phase, said thermosetting polyester resin having a transition point of 80°~230° C., a number average molecular weight of 500~20,000, providing that when A is p-phenylene, n is an integer of 8 to 20.

2. A thermosetting polyester resin comprising a combination of repeating units of the formula: A-X-B ... [I], wherein 100 to 50 mol % of A stands for a mesogenic group selected from a polyphenylenen group in which 2 or more benzene rings are aligned and connected to each other in their respective para-positions, a polyphenylene group in which 2 or more benzene rings are aligned and connected to each other in their respective para-positions through an azo, azoxy, azomethine, ester or trans-vinylene bond, or a 2,6-naphthylene group, the remaining 50 mol % of A stands for a member selected from the group consisting of p-phenylene, m-phenylene, o-phenylene and trans 1,4-cyclohexylene; B is a spacer group represented by the formulas:

—(CH$_2$)$_{\overline{n}}$  or  —(CH$_2$CH$_2$O)$_{\overline{m}}$CH$_2$CH$_2$—, in which n is an integer of 2 to 20 and m is an integer of 1 to 19; and X is an ester bond, and a repeating unit of the formula: R ... [II], wherein R stands for a bivalent to hexavalent aliphatic, aromatic or alicyclic hydrocarbon residue which may include up to 4 OH and/or COOH groups, the weight ratio of said units (I) to (II) being 99.9:0.1~70:30, the adjoining two repeating units placed in random order being connected through an ester bond, the end bondings of the connected repeating units being occupied by OH, COOH or their reactive derivatives, the sum of the resinous acid value and OH value being 30~150, and being capable of forming an anisotropic molten phase, said thermosetting polyester resin having a transition point of 80°~230° C., a number average molecular weight of 500~10,000, provided that when A is p-phenylene, n is an integer of 8 to 20.

* * * * *